US006962341B2

(12) United States Patent
Szam

(10) Patent No.: US 6,962,341 B2
(45) Date of Patent: Nov. 8, 2005

(54) COUPLING FOR FEEDING A HEAT-EXCHANGE MEDIUM TO A ROTATING BODY

(75) Inventor: Peter Szam, Gerstetten (DE)

(73) Assignee: Christian Maier GmbH & Co. Maschinenfabrik, Heidenheim (DE)

( * ) Notice: Subject to any disclaimer, the term of this patent is extended or adjusted under 35 U.S.C. 154(b) by 187 days.

(21) Appl. No.: 10/358,521

(22) Filed: Feb. 5, 2003

(65) Prior Publication Data

US 2003/0151205 A1 Aug. 14, 2003

(30) Foreign Application Priority Data

Feb. 13, 2002 (DE) ........................................ 102 05 790

(51) Int. Cl.[7] ................................................ F16J 15/40
(52) U.S. Cl. ...................................... 277/409; 277/411
(58) Field of Search ................................ 277/408, 409, 277/411; 165/90, 89

(56) References Cited

U.S. PATENT DOCUMENTS 4,466,619 A * 8/1984 Adams ....................... 277/367
5,156,523 A 10/1992 Maier
5,203,575 A * 4/1993 Azibert et al. .............. 277/348
5,778,971 A 7/1998 Szam

* cited by examiner

*Primary Examiner*—Enoch Peavey
(74) *Attorney, Agent, or Firm*—Herbert Dubno; Andrew Wilford

(57) ABSTRACT

A coupling for supplying a heat-exchange liquid to a load has a shaft extending from the load and centered on the axis. A nonrotating housing surrounding the shaft at the tube end has a connection so that the heat-exchange liquid can be pumped into the load. A roller bearing is engaged between the housing and the shaft axially between the opening and the load. Respective seal rings rotationally fixed on and sealed to the housing and the shaft between the bearing and the opening bear axially on one another. A cooling sleeve on the housing surrounds and extends axially past the seal rings. An insulator has a part closely radially surrounding the shaft between the seal rings and the opening and forming therewith a small gap through which the heat-exchange liquid can flow.

11 Claims, 2 Drawing Sheets

COUPLING FOR FEEDING A HEAT-EXCHANGE MEDIUM TO A ROTATING BODY

FIELD OF THE INVENTION

The present invention relates to a coupling. More particularly this invention concerns a coupling for feeding a heat-exchange medium from a nonrotating body to a rotating body.

BACKGROUND OF THE INVENTION

A standard coupling is used for feeding a heat-exchange medium, e.g. oil, to a rotating body or load such as a drying drum, heating roller or the like. The coupling is connected as described in U.S. Pat. No. 5,156,523 between a stationary supply of the medium and the rotating load and comprises a tubular rotor shaft fixed to the rotating load and rotatable about and centered on an axis and a nonrotatable support/housing fixed stationarily adjacent and surrounding the load. This support/housing is provided with an inlet connected to the supply and is formed with a passage permitting fluid communication between the supply and the load through the shaft. At least one roller bearing that is lubricated with grease or oil rotationally supports the shaft in the housing and outer and inner seals axially flanking the bearing define an annular substantially closed chamber containing the bearing and each seal between the housing and the shaft so that the oil lubricant is segregated from the heat-exchange medium. The inner seal has an inner side exposed to the medium and the outer seal has an outer side exposed to the surrounding atmosphere. A coolant is circulated through the chamber.

Thus the coolant lubricates the bearings. The cooled bearing therefore not only has an increased service life, but also any chemical reaction with the lubricant is ruled out. Furthermore the bearings do not have to be designed for very high temperatures and the heat expansion incurred thereby.

The described system is nonetheless fairly complex. Furthermore the circulating heat-exchange medium and the lubricant for the bearing can mix somewhat. What is more the bearing is often excessively heated by the hot heat-exchange medium, shortening the bearing service life.

OBJECTS OF THE INVENTION

It is therefore an object of the present invention to provide an improved coupling for a rotating load.

Another object is the provision of such an improved coupling for a rotating load which overcomes the above-given disadvantages, that is which keeps the bearing lubricant and the heat-exchange medium apart and at the same time protects the bearing from the heat of the heat-exchange medium.

SUMMARY OF THE INVENTION

A coupling for supplying a heat-exchange liquid to a load rotatable about an axis has according to the invention a shaft or tube assembly fixed to and extending from the load, having an end opening, and centered on the axis. A nonrotating housing surrounding the shaft at the end opening has a connection so that the heat-exchange liquid can be pumped through the housing, opening, and shaft into the load. A roller bearing is engaged between the housing and the shaft axially between the opening and the load so that the shaft can rotate freely in the housing about the axis. Respective seal rings rotationally fixed on and sealed to the housing and the shaft between the bearing and the opening bear axially on one another, in fact sliding on one another on rotation of the load. In accordance with the invention a cooling sleeve on the housing surrounds and extends axially past the seal rings. An insulator has a part closely radially surrounding the shaft between the seal rings and the opening and forming therewith a small gap through which the heat-exchange liquid can flow so that the seal rings are exposed to the liquid flowing through the gap and substantially prevent it from getting to the seals. According to the invention oil lubricant, e.g. grease, is supplied to the bearing.

With this system the maximum temperature that the bearing will be subjected to is substantially reduced. Since it is this bearing that actually supports the connector housing on the shaft formed by the shaft, or vice versa, it needs to operate at a low temperature in order to have a long service life. At the same time the seal arrangement ensures that what little leakage there is to the rear side of the seal, that is between the seal rings and the insulator, is minor and this liquid is exposed to the cooling ring.

In accordance with the invention the insulator is a sleeve fixed in the housing and having a radially inwardly directed surface centered on the axis, closely juxtaposed with the shaft, and forming therewith the gap. The inner surface of the insulator sleeve and the confronting outer surface of the shaft are both cylindrical. Thus the small amount of fluid that moves through the gap to the seal rings will be in an insulated and cooled space.

The insulator sleeve according to the invention axially abuts the cooling sleeve. This structure therefore defines the insulated cooled compartment on one side of the sliding seal rings that is filled with the heat-exchange fluid. The insulator sleeve is comprised of material of low thermal conductivity.

To further decrease the temperature at the seal rings the cooling sleeve is formed with a chamber and a coolant—oil or even water—is circulated through this chamber. Furthermore the cooling sleeve is formed with generally diametrally opposite inlet and outlet ports and the coolant is pumped into the inlet port and exits the chamber via the outlet port. In addition a seal is provided between the housing and the shaft and between the seal rings and the bearing. The seal forms a chamber surrounding the shaft and lying between the seal and the seal rings. Again, a liquid is filled into the chamber formed by the seal to form a barrier completely separating the heat-exchange medium on one side and the lubricant on the other. The shaft includes an outer tube that is double-walled in a region extending axially past the seal rings.

BRIEF DESCRIPTION OF THE DRAWING

The above and other objects, features, and advantages will become more readily apparent from the following description, reference being made to the accompanying drawing in which:

As seen in FIG. 1 a coupling 1 carries a rotating load 2, here a roller centered on a horizontal axis A and having a shaft or tube assembly 3 comprised of coaxial inner and outer tubes 3*a* and 3*b*. A pair of bearings 4 support the shaft 3 for rotation about the axis A in a nonrotatable support housing 5. Means 25 is provided to pump oil through the bearings 4. Further means 26 is attached to connections 6*a* and 6*b* on the housing 5 for supplying a heat-exchange liquid, e.g. hot oil or water, to the inner tube 3*a* and then drawing it out through radially throughgoing ports 7 from between the inner and outer tubes 3*a* and 3*b*.

Figure 2:
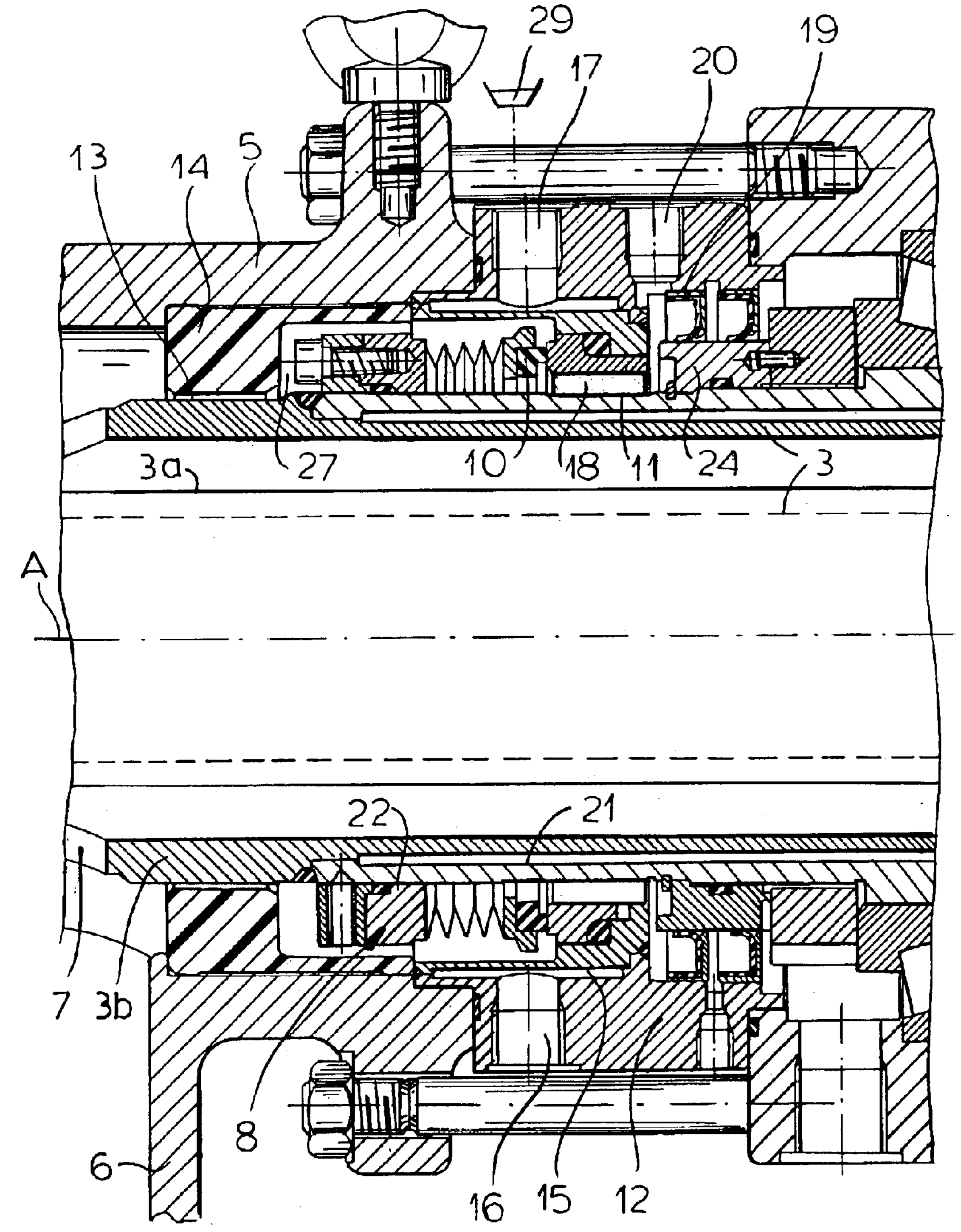
FIG. 2 is a large-scale sectional view of the coupling.

A seal assembly 8 between the support housing 5 and the outer tube 3*b* has as shown in FIG. 2 an axially expansible and compressible bellows 9 that is fixed at a rear end via a ring 22 on the tube 3*b* and that presses a slide ring 10 axially forward (to the right in FIG. 2) against another slide ring 11 fixed to the support housing 5. A cooling sleeve 12 fixed in the housing 5 surrounds and extends axially forward and rearward past the slide rings 10 and 11 and in fact carries the ring 11. This sleeve 12 is formed with an annular chamber 15 that surrounds and extends axially in both direction past the rings 10 and 11 and that is connected on its lower side to a radially outwardly extending outlet port or opening 16 and on its diametrally opposite upper side to a radially outwardly opening inlet port or opening 17 connected to a supply 29 of a coolant, e.g. oil or even water. There is no possibility of mixing of the coolant in the chamber 15 with the heat-exchange liquid flowing through the shaft 3.

Figure 1:
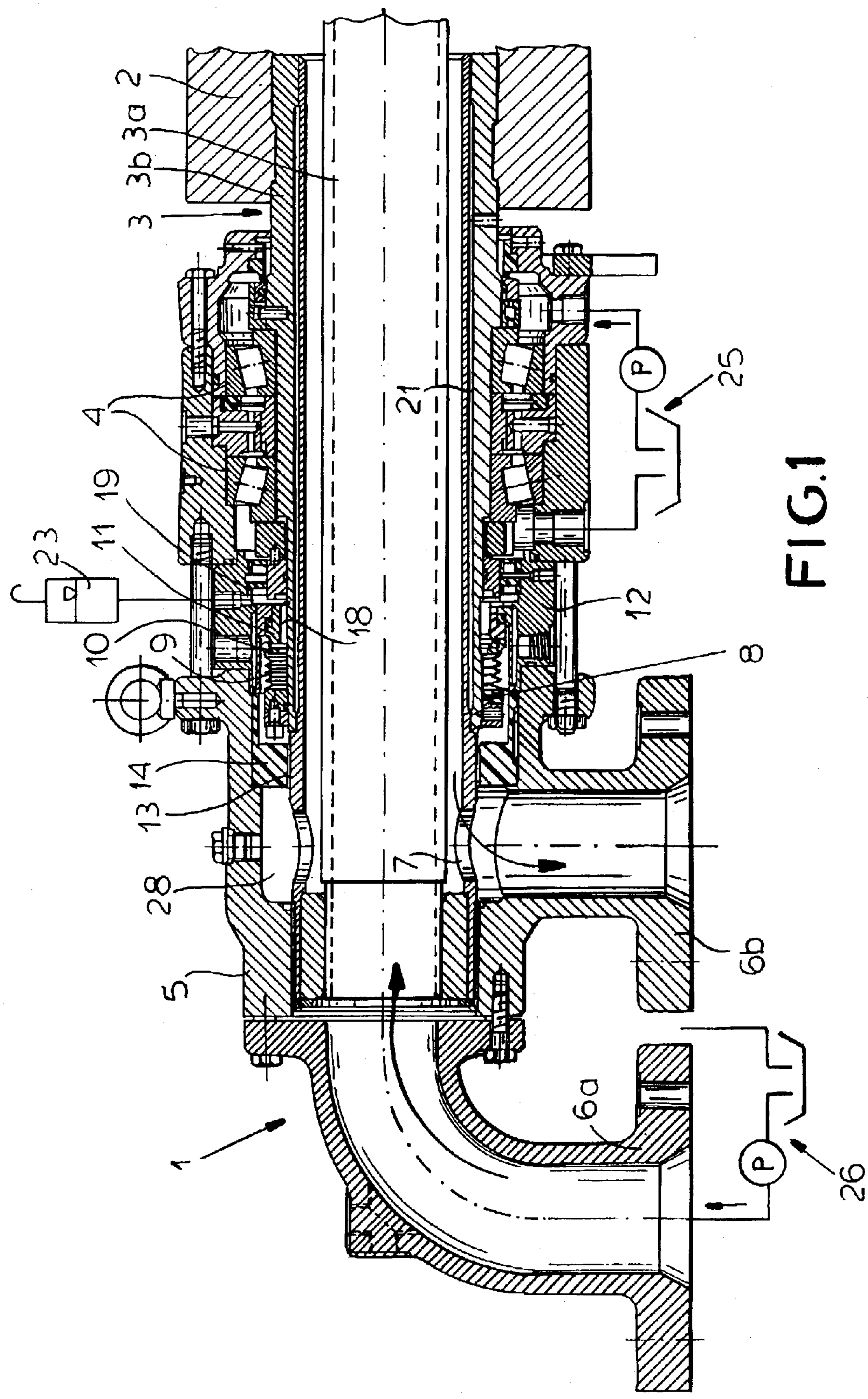
FIG. 1 is an axial section through a coupling according to the invention.

An insulator sleeve 14 is fitted to the nonrotating support housing 5 and has a rear end formed with a radially inwardly projecting ridge having a radially inwardly directed cylindrical surface closely radially confronting a radially outwardly directed cylindrical surface of the tube 3*b* and forming therewith a narrow cylindrical gap 13 opening into an chamber 28 (FIG. 1) connected to the outlet connection 6*b* so that a small amount of the heat-exchange liquid exiting from the shaft 3 can leak through the gap 13 into an outer chamber 27 surrounding the seal assembly 8. As a result of the small flow cross section of the gap 13 and the fact that the fluid in the chamber 28 on the rear and external side of it has already given up most of its heat to the load 2 being heated, the temperature of this fluid leaking forward through the gap 13 will be fairly low. Furthermore this fluid is confined in the chamber 27 that is externally defined by surfaces that are insulated and/or cooled.

A gland-type seal 19 fitted between the nonrotating support housing 5 and a ring 24 fitted to the outer tube 3*b* forms an inner chamber 18 that extends axially rearward underneath the rings 10 and 11 and the bellows 9. An inlet 20 allows fluid to be fed from a supply 23 (FIG. 1) into this inner chamber 18 so that no heat-exchange fluid can leak from the outer chamber 27 through the interface between the rings 10 and 11 and oxidize the more delicate parts of the coupling 1.

Furthermore the outer tube 3*b* is formed with a cylindrically tubular chamber 21 extending axially completely past the seal assembly S and providing some insulation between the hot liquid in the shaft 3 and the seal assembly 8.

I claim:

1. A coupling for supplying a heat-exchange fluid to a load rotatable about an axis, the coupling comprising:

a shaft fixed to and extending from the load, having an end opening, and centered on the axis;

a nonrotating housing surrounding the shaft at the end opening;

means connected to the housing for pumping the heat-exchange fluid through the housing, opening, and shaft into the load;

a roller bearing engaged between the housing and the shaft axially between the opening and the load, whereby the shaft can rotate freely in the housing about the axis;

respective seal rings rotationally fixed on and sealed to the housing and the shaft between the bearing and the opening and bearing axially on one another, the seal rings sliding on one another on rotation of the load and forming an inner chamber with the shaft and an outer chamber outside the inner chamber and separated by the seal rings from the inner chamber;

a cooling sleeve on the housing surrounding and extending axially past the seal rings;

means for cooling the cooling sleeve; and an insulator having a part closely radially surrounding the shaft between the seal rings and the opening and forming with the shaft a small gap through which the heat-exchange fluid can flow into the outer chamber, the seal rings being exposed in the outer chamber to the fluid flowing through the gap and substantially blocking this fluid from getting to the inner chamber and bearings.

2. The coupling defined in claim 1, further comprising means connected to the housing for supplying oil lubricant to the bearing.

3. The coupling defined in claim 1 wherein the insulator is a sleeve fixed in the housing and having a radially inwardly directed surface centered on the axis, closely juxtaposed with the shaft, and forming therewith the gap.

4. The coupling defined in claim 3 wherein the insulator sleeve axially abuts the cooling sleeve.

5. The coupling defined in claim 4 wherein the insulator sleeve is comprised of material of low thermal conductivity.

6. The coupling defined in claim 1 wherein the cooling sleeve is formed with a chamber and the cooling means circulates a coolant through the cooling-sleeve chamber.

7. The coupling defined in claim 6 wherein the cooling sleeve is formed with generally diametrally opposite inlet and outlet ports and the coolant is pumped into the inlet port and exits the chamber via the outlet port.

8. The coupling defined in claim 1, further comprising a seal between the housing and the shaft and between the seal rings and the bearing, the seal forming a chamber surrounding the shaft and lying between the seal and the seal rings, the coupling further comprising means for pumping a liquid into the chamber formed by the seal.

9. The coupling defined in claim 1 wherein the shaft includes an outer tube that is double-walled in a region extending axially past the seal rings.

10. The coupling defined in claim 1, further comprising an axially compressible bellows carrying one of the seal rings.

11. The coupling defined in claim 10 wherein the bellows is connected to the shaft, the other of the seal rings being fixed on the housing.

* * * * *